United States Patent
Ustel et al.

(10) Patent No.: US 10,487,702 B2
(45) Date of Patent: Nov. 26, 2019

(54) METHOD OF ADAPTIVELY CONTROLLING A MOTOR VEHICLE ENGINE SYSTEM

(71) Applicant: Ford Global Technologies, LLC, Dearborn, MI (US)

(72) Inventors: Mark Ustel, Harlow (GB); Mohammad Farid, London (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/807,739

(22) Filed: Nov. 9, 2017

(65) Prior Publication Data
US 2018/0149048 A1 May 31, 2018

(30) Foreign Application Priority Data
Nov. 25, 2016 (GB) .................................. 1619998.6

(51) Int. Cl.
*F01L 1/34* (2006.01)
*F01L 3/24* (2006.01)
(Continued)

(52) U.S. Cl.
CPC .................. *F01L 3/24* (2013.01); *F01L 1/02* (2013.01); *F01L 1/022* (2013.01); *F01L 1/024* (2013.01); *F02D 35/028* (2013.01); *F02D 41/009* (2013.01); *F02D 41/2464* (2013.01); *F16H 7/02* (2013.01); *F16H 7/06* (2013.01); *G07C 5/006* (2013.01); *G07C 5/0808* (2013.01); *F01L 2001/0537* (2013.01); *F01L 2800/16* (2013.01);
(Continued)

(58) Field of Classification Search
CPC ........ F02D 41/0087; F16H 7/06; F01L 1/022; F01L 3/24; F01L 2820/041; F01L 2820/042; G07C 5/0808
USPC ............................................ 123/90.15, 90.17
See application file for complete search history.

(56) References Cited

U.S. PATENT DOCUMENTS 5,689,067 A    11/1997  Klein et al.
7,389,681 B2    6/2008  Mezger et al.
(Continued)

FOREIGN PATENT DOCUMENTS

DE         10233815 C1    10/2003
DE     102006001929 A1     8/2007
(Continued)

OTHER PUBLICATIONS

Intellectual Property Office of the United Kingdom, Combined Search and Examination Report Issued in Application No. GB1619998. 6, dated Apr. 12, 2017, South Wales, 6 pages.

*Primary Examiner* — Ching Chang
(74) *Attorney, Agent, or Firm* — Geoffrey Brumbaugh; McCoy Russell LLP (57) ABSTRACT

A method is disclosed for adaptively controlling an engine system of a motor vehicle comprising the steps of evaluating the outputs from angular position sensors associated with inlet and exhaust camshafts of an engine of the engine system to establish whether differences between the currently measured positions and previously saved positions are the result of elongation of an endless drive used to drive the camshafts or due to some other reason. If it is confirmed that the differences are due to elongation of the endless drive then the measured values of angular position are used in the control of a number of engine functions.

20 Claims, 5 Drawing Sheets

(51) Int. Cl.
*F01L 1/02* (2006.01)
*F02D 35/02* (2006.01)
*F16H 7/02* (2006.01)
*F16H 7/06* (2006.01)
*G07C 5/00* (2006.01)
*G07C 5/08* (2006.01)
*F02D 41/00* (2006.01)
*F02D 41/24* (2006.01)
*F02D 41/22* (2006.01)
*F01L 1/053* (2006.01)

(52) U.S. Cl.
CPC ..... *F01L 2800/17* (2013.01); *F01L 2820/041* (2013.01); *F01L 2820/042* (2013.01); *F02D 41/0087* (2013.01); *F02D 41/22* (2013.01); *F02D 2250/14* (2013.01)

(56) References Cited

U.S. PATENT DOCUMENTS

| | | |
|---|---|---|
| 8,132,549 B2 | 3/2012 | Dell et al. |
| 8,813,701 B2 * | 8/2014 | Lengfeld ................. F01L 1/352 123/90.11 |
| 8,965,661 B2 | 2/2015 | Reuschenbach et al. |

FOREIGN PATENT DOCUMENTS

| | | |
|---|---|---|
| DE | 102014011153 A1 | 1/2016 |
| FR | 2850755 A1 | 8/2004 |

* cited by examiner

180
METHOD OF ADAPTIVELY CONTROLLING A MOTOR VEHICLE ENGINE SYSTEM

CROSS REFERENCE TO RELATED APPLICATION

The present application claims priority to United Kingdom Application No. 1619998.6, filed on Nov. 25, 2016. The entire contents of the above-referenced application are hereby incorporated by reference in its entirety for all purposes.

BACKGROUND/SUMMARY

This disclosure relates to an engine system of a motor vehicle including an engine having at least two camshafts driven by an endless drive from a crankshaft of the engine and in particular to adaptively controlling the engine based upon variations in camshaft timing due to wear of the endless drive.

It is known that over time an endless drive used to drive a pair of camshafts of an engine will wear due to usage and that this wear has the effect of producing elongation of the endless drive (primary drive) and includes both stretching of the endless drive itself and abrasion of parts of the endless drive such as the teeth of a toothed belt and the links of a drive chain.

Such wear will result in the angular relationship between the crankshaft and the camshafts and between the two camshafts changing thereby resulting in valve timing errors.

Primary drive elongation will cause a shift in the retarded direction for both the intake and exhaust camshaft timing and this in turn will degrade combustion stability and fuel economy at idle and other part-load conditions and will reduce volumetric efficiency at high loads thereby reducing available torque from the engine.

In addition, retarded exhaust camshaft timing will erode any safety margin that protects against piston to valve contact and retarded intake camshaft timing will reduce the available window for safe operation of valve deactivation required for cylinder deactivation.

In addition to the foregoing, any primary drive tensioner provided to remove the additional primary drive slack caused by primary drive elongation will only function effectively up to a predetermined percentage elongation of the primary drive.

It is an object of this disclosure to provide a method of controlling an engine system of a motor vehicle including an engine having at least two camshafts driven by an endless drive from a crankshaft of the engine including an endless drive evaluation process to confirm and quantify the presence of endless drive elongation and the adaptive control of the engine based upon the results of the endless drive evaluation process.

According to a first aspect of the disclosure there is provided a method of adaptively controlling a motor vehicle engine system comprising an engine having a crankshaft, first and second camshafts driven by an endless drive system including an endless drive from a crankshaft of the engine and an electronic controller wherein the method comprises: measuring an angular position for one of the first and second camshafts when the crankshaft is in a reference position and using the measured angular position to produce a value of change in angular position for the one camshaft; measuring an angular position for the other camshaft of the first and second camshafts when the crankshaft is the same reference position and using the measured angular position to produce a value of change in angular position for the other camshaft; establishing whether any change in angular position for one camshaft is in the same retarded direction as a corresponding angular change for the other camshaft; establishing whether any changes in angular position of the camshafts are gradual changes; establishing whether a ratio of change of angular position of one camshaft with respect to the other camshaft is substantially equal to a predefined fixed ratio based upon the geometry of the endless drive system; and if the results of steps c to e indicate that any change in angular position is in the same retarded direction for both camshafts and any changes in angular position are gradual changes and the ratio of angular change of one camshaft with respect to the other camshaft is substantially equal to a predefined fixed ratio based upon the geometry of the endless drive system, the method further comprises confirming that the current change in angular position of the first and second camshafts is the result of elongation of the endless drive and using the measured angular positions of the first and second camshafts in the control of one or more operational functions of the engine.

This has the advantage that not only can elongation of the endless drive be detected it can also be confirmed that any changes in angular position of the camshafts are due to such elongation and not to some other system error or fault.

Establishing whether any change in angular position for one camshaft is in the same retarded direction as a corresponding angular change for the other camshaft may comprise measuring the angular position of the first and second camshafts when the crankshaft is in the reference position, comparing the current measured angular positions of the first and second camshafts with previously saved datum angular positions for the first and second camshafts to quantify the difference in angular position of each camshaft compared to its respective datum position and using the differences in angular position to establish whether the changes in angular position are in the same retarded direction for both camshafts.

Establishing whether any changes in angular position of the camshafts are a gradual changes may comprise comparing the current measured position of each camshaft when the crankshaft is in a reference position with one or more preceding measurements of angular position for the same camshaft when the crankshaft is in the same reference position and if the changes in angular position follow a substantially uniform pattern using this as confirmation that the changes in angular position are the result of gradual elongation of the endless drive.

Establishing whether a ratio of change of angular position of one of the camshafts compared to the other camshaft is substantially equal to a predefined fixed ratio based upon the geometry of the endless drive system may comprise dividing a change in angular position of one of the camshafts with a corresponding change in angular position of the other camshaft to produce a calculated ratio of change and comparing the calculated ratio of change with a predefined ratio based upon the geometry of the endless drive system.

The operational function of the engine may be the timing of the opening and closing of exhaust valves of the engine to meet a current demand.

The operational function of the engine may be the timing of the opening and closing of inlet valves of the engine to meet a current demand.

The operational function of the engine may be the closing of an exhaust valve of a cylinder of the engine to avoid contact between the respective valve and a piston of the respective cylinder.

The engine may have a deactivatable cylinder and the operational function of the engine may be the deactivation of the deactivatable cylinder of the engine.

The first camshaft may be an inlet camshaft and the measured angular position of the inlet camshaft of the engine may be used to adapt a deactivation control window for the deactivatable cylinder of the engine.

The operational function may be the provision of an indication to a user of the motor vehicle that a predefined action is advised when the measured angular positions of the first and second camshafts indicate that a predefined elongation limit for the endless drive has been exceeded.

The predefined action may be one of changing the oil of the engine and changing the endless drive of the engine.

The first camshaft may be an inlet camshaft and the second camshaft may be an exhaust camshaft.

The endless drive system may comprise a chain engaged with a driving chain wheel attached to the crankshaft of the engine and first and second driven chain wheels fastened to the first and second camshafts respectively.

According to a second aspect of the disclosure there is provided a motor vehicle engine system comprising an engine having first and second camshafts driven by an endless drive system including an endless drive from a crankshaft of the engine, a crankshaft sensor to sense the rotational position of the crankshaft and first and second camshaft sensors to sense the rotational positions of the first and second camshafts respectively when the crankshaft is in a reference position and an electronic controller to process outputs from the crankshaft sensor and the two camshaft sensors wherein the electronic controller is operable to: use the outputs from the first and second camshaft sensors to establish whether any change in angular position for one camshaft is in the same retarded direction as a corresponding angular change for the other camshaft; use the outputs from the first and second camshaft sensors to establish whether any changes in angular position of the camshafts are gradual changes; use the outputs from the first and second camshaft sensors to establish whether a ratio of change of angular position of one camshaft with respect to the other camshaft is substantially equal to a predefined fixed ratio based upon the geometry of the endless drive system; and if the results of steps a to c indicate that any change in angular position is in the same retarded direction for both camshafts and any changes in angular position are gradual changes and the ratio of angular change of one camshaft with respect to the other camshaft is substantially equal to a predefined fixed ratio based upon the geometry of the endless drive system, the electronic controller is operable to use this as confirmation that a current change in angular position of the first and second camshafts is the result of elongation of the endless drive and is further operable to use the measured angular positions of the first and second camshafts in the control of one or more operational functions of the engine.

The electronic controller may be operable to establish whether any change in angular position for one camshaft is in the same retarded direction as a corresponding angular change for the other camshaft by using the first and second camshaft sensors to measure the angular position of the first and second camshafts when the crankshaft is sensed by the crankshaft sensor to be in the reference position, compare the current measured angular positions of the first and second camshafts with datum angular positions for the first and second camshafts previously saved in a memory of the electronic controller to quantify the difference in angular position of each camshaft compared to its respective datum position and use the differences in angular position to establish whether the changes in angular position are in the same retarded direction for both camshafts.

The electronic controller may be arranged to establish whether any changes in angular position of the camshafts are a gradual changes by comparing the current measured position of each camshaft as provided by the outputs from the first and second camshaft sensors when the crankshaft is sensed by the crankshaft sensor to be in the reference position with one or more preceding measurements of angular position for the same camshaft when the crankshaft is in the same reference position and, if the changes in angular position follow a substantially uniform pattern, confirm that the changes in angular position are the result of gradual elongation of the endless drive.

The electronic controller may be arranged to establish whether the ratio of change of angular position of one of the camshafts compared to the other camshaft is substantially equal to a predefined fixed ratio based upon the geometry of the endless drive system by dividing a change in angular position of one of the camshafts with a corresponding change in angular position of the other camshaft to produce a calculated ratio of change and comparing the calculated ratio of change with a predefined ratio stored in a memory of the electronic controller based upon the geometry of the endless drive system.

The predefined ratio may be a ratio of the length of the endless drive from a drive wheel attached to the crankshaft to a driven wheel attached to one end of the first camshaft with respect to the sum of the length of the endless drive from the drive wheel attached to the crankshaft to the driven wheel attached to one end of the first camshaft and the length of the endless drive between the driven wheel attached to the first camshaft and a driven wheel attached to one end of the second camshaft.

The operational function of the engine may be the timing of the opening and closing of exhaust valves of the engine to meet a current demand.

The operational function of the engine may be the timing of the opening and closing of inlet valves of the engine to meet a current demand.

The operational function of the engine may be the closing of an exhaust valve of a cylinder of the engine to avoid contact between the respective valve and a piston of the respective cylinder.

The engine may have a deactivatable cylinder and the operational function of the engine may be the deactivation by the electronic controller of the deactivatable cylinder of the engine.

The first camshaft may be an inlet camshaft and the measured angular position of the inlet camshaft of the engine may be used to adapt a deactivation control window associated with the deactivatable cylinder of the engine and the electronic controller is arranged to prevent deactivation of the deactivatable cylinder if the current inlet camshaft position is outside the deactivation window.

The operational function may be the provision by the electronic controller of an indication to a user of the motor vehicle that a predefined action is advised when the measured angular positions of the first and second camshafts indicate that a predefined elongation limit for the endless drive has been exceeded.

The predefined action may be one of changing the oil of the engine and changing the endless drive of the engine.

The first camshaft may be an inlet camshaft of the engine and the second camshaft may be an exhaust camshaft of the engine.

According to a third aspect of the disclosure there is provided a motor vehicle having an engine system constructed in accordance with said second aspect of the disclosure.

BRIEF DESCRIPTION OF THE FIGURES

The disclosure will now be described by way of example with reference to the accompanying drawings of which.

DETAILED DESCRIPTION OF THE FIGURES

Figure 1:
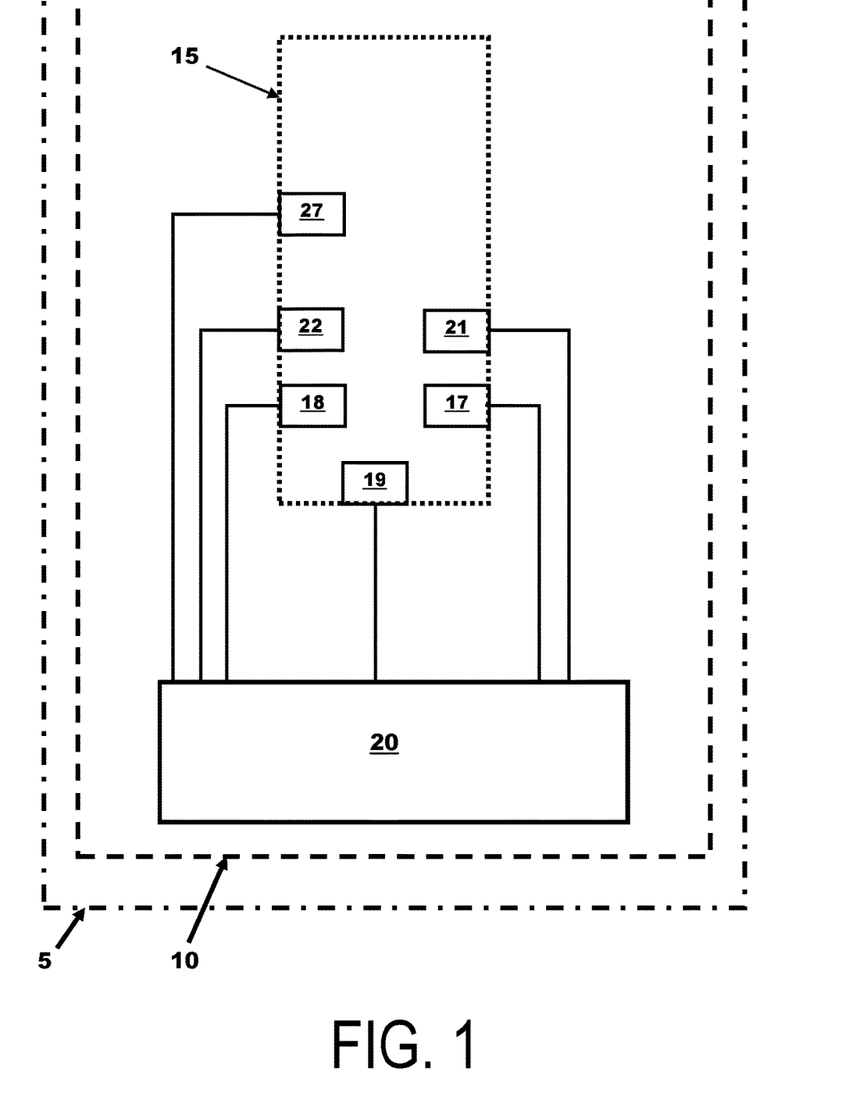
FIG. 1 is a schematic diagram of a motor vehicle in accordance with a third aspect of the disclosure having an engine system in accordance with a second aspect of the disclosure.
Figure 2:
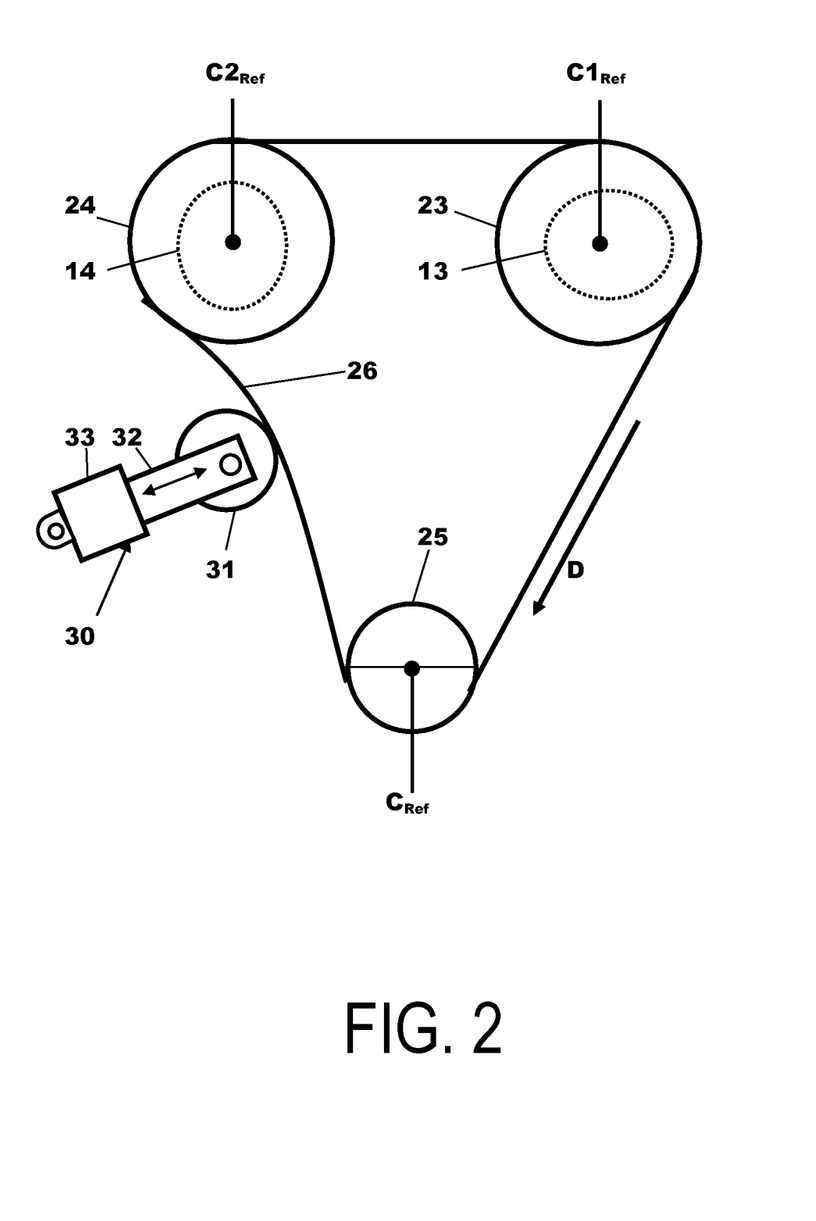
FIG. 2 is a diagrammatic end view of the engine forming part of the engine system shown in FIG. 1 showing a primary drive system for a pair of camshafts of the engine in a reference position in which no elongation of the endless drive has taken place.
Figure 3:
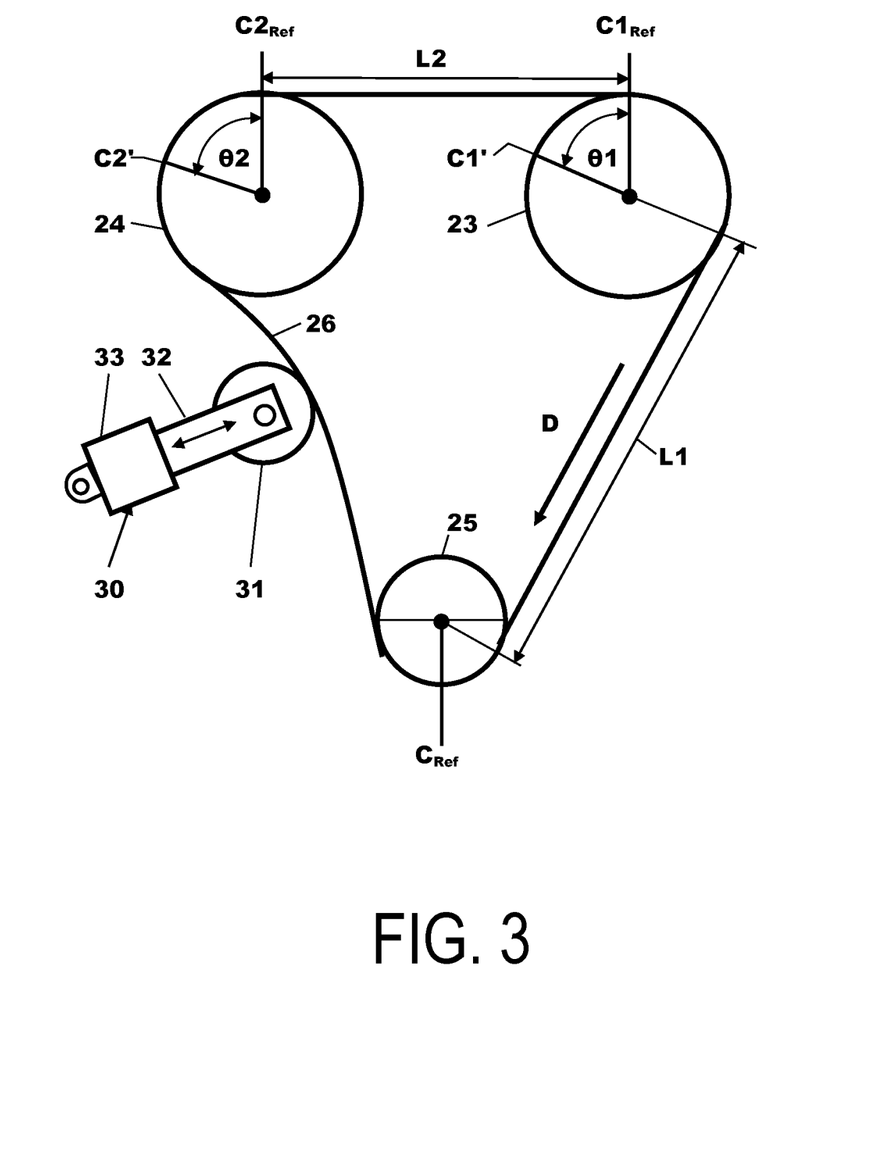
FIG. 3 is a diagrammatic view as shown in FIG. 2 but showing the effect of elongation of the endless drive on the rotational positions of the pair of camshafts.

With particular reference to FIGS. 1 to 3 there is shown a wheeled motor vehicle 5 having an engine system 10. It will be appreciated that the motor vehicle 5 could be of any type or configuration having two or more road wheels. The engine system in the case of this example includes a twin overhead camshaft reciprocating internal combustion engine 15 and an electronic controller 20. It will be appreciated that, although in the case of the example being described the engine 15 is the only source of motive power for the motor vehicle 5, the engine could alternatively form part of a hybrid vehicle powertrain.

It will also be appreciated that the electronic controller need not be a single unit but rather could be formed from a number of communicating electronic processors or devices that interact to control the operation of the engine 15.

The engine system 10 further includes first and second camshaft rotary position sensors 17 and 18, a crankshaft position sensor 19, first and second camshaft phasers 21 and 22 and a cylinder deactivation apparatus 27.

The crankshaft position sensor 19 is arranged to measure the rotational angle or position of the crankshaft and can be in the form of a magnetic detector arranged to detect the teeth on a toothed ring made from a magnetically conductive material fastened to one end of the crankshaft. As is known in the art one of the gaps between teeth of the toothed ring has a greater width than the other tooth gaps of the toothed ring and thereby marks a crankshaft reference position. When the crankshaft reference position is reached, a reference mark is generated as a signal output from the crankshaft sensor 19. When this reference output is detected by the electronic controller 20 it is used to trigger other measurements such as camshaft rotational position and for controlling the operation of the engine 15.

The first rotary position sensor 17 is arranged to sense the rotary position of a first camshaft 13 (shown in dotted outline on FIG. 2) and provide an output to the electronic controller 20 and the second rotary position sensor 18 is arranged to sense the rotary position of a second camshaft 14 (shown in dotted outline on FIG. 2) and provide an output to the electronic controller 20.

The first camshaft phaser 21 is operable to vary the rotary position of the first camshaft 13 relative to a datum position in response to a control output from the electronic controller 20 and can be of any known type. In the case of this example, the first camshaft 13 is an inlet camshaft of the engine 15 and the mechanism forming the first camshaft phaser 21 is arranged to rotate the camshaft 13 in a clockwise direction as viewed on FIGS. 2 and 3 to advance opening of inlet valves (not shown) operated by the inlet camshaft 13 from the base or datum position in response to a control output from the electronic controller 20.

The second camshaft phaser 22 is operable to vary the rotary position of the second camshaft 14 relative to a datum position in response to a control output from the electronic controller 20 and can be of any known type. In the case of this example, the second camshaft 14 is an exhaust camshaft of the engine 15 and the mechanism forming the second camshaft phaser 22 is arranged to rotate the camshaft 13 in an anti-clockwise direction as viewed on FIGS. 2 and 3 to retard opening of exhaust valves (not shown) operated by the exhaust camshaft 13 from the base or datum position in response to a control output from the electronic controller 20.

In the case of this example the engine 15 is a three cylinder engine and the cylinder deactivation apparatus 27 comprises collapsing finger followers arranged between the first and second camshafts 13, and 14 and the valves that they actuate for one cylinder of the engine 15. One example of such a three cylinder engine having a deactivatable cylinder is described in GB Patent Publication 2,496,407.

When hydraulic pressure is applied to respective locking pins of the collapsing finger followers the collapsing finger followers are locked so as to transmit motion from the associated camshaft to the valves operated by that camshaft and when the hydraulic pressure is removed the locking pins disengage and the associated valves will be not be actuated by the camshafts but will remain closed.

The control of hydraulic pressure to the collapsing finger followers is controlled by one or more electro-hydraulic valves in response to a control output from the electronic controller 20.

The electronic controller 20 is shown in FIG. 1 as a microcomputer including non-transitory memory or read only memory for storing executable instructions, the instructions for performing the methods described herein. The electronic controller 20 is shown receiving various signals from sensors coupled to the engine 15, and transmitting instructions to various components. The sensors may include the crankshaft position sensor 19, and camshaft position sensors 17 and 18, for example. The electronic controller 20 may control the first and second camshaft phasers 21 and 23, and the cylinder deactivation apparatus 27.

It will be appreciated that in practice the electronic controller 20 will normally also control the flow of fuel to the engine 15 and that the fuel supply system has been omitted from FIG. 1 as it is not directly relevant to this disclosure.

It will be appreciated that the disclosure is not limited to the use of collapsing finger followers for cylinder deactivation and that other types of cylinder deactivation apparatus can be used. It will further be appreciated that more than one cylinder of an engine can be arranged for deactivation in some cases.

As shown in FIGS. 2 and 3 an endless drive in the form of a primary drive chain 26 is used to driveably connect driven chain wheels 23, 24 to a driving chain wheel 25.

The first driven chain wheel 23 is used to rotate the first camshaft 13 and the second chain wheel 24 is used to rotate the second camshaft 14. The driving chain wheel 25 is fastened to one end of a crankshaft (not shown) of the engine 15 so as to drive the two camshafts 13, 14 when the engine 15 is running.

The direction of movement of the primary drive chain 26 when the engine 15 is running is indicated by the arrows 'D' on FIGS. 2 and 3.

A slack adjuster 30 is located on a slack side of the primary chain drive between the driving chain wheel 25 and the second driven chain wheel 24. The slack adjuster 30 has a freely rotating sprocket 31 engaged with the primary drive chain 26. The sprocket 31 is rotatably supported by an adjuster arm 32 that is displaceable relative to a fixed mount 33 so as to take up slack in the primary drive chain 26 as is well known in the art.

In FIG. 2 the driving chain wheel 25 is shown in a reference or datum position CRef and the first and second driven chain wheels 23 and 24 are shown in corresponding datum or reference positions C1Ref and C2Ref. These are the idealized positions that the crankshaft and the camshafts 13, 14 will adopt with a new primary drive chain 25 when the crankshaft is in the datum or reference angular position CRef and the camshafts 13, 14 are locked in a predefined angular relationship with respect to their respective chain wheel 23, 24.

In FIG. 3 the effect of elongation of the primary drive 26 is shown, albeit in an exaggerated form so as to ease understanding of the disclosure.

The crankshaft is in the same reference position as shown in FIG. 2, that is to say, CRef but the first and second camshafts 13 and 14 have rotated to retarded positions C1' and C2' compared to the positions C1Ref and C2Ref due to the elongation of the primary drive chain 26.

The first chain wheel 23 has rotated in a retard direction to the angular position C1' which is displaced from the reference position C1Ref by an angle of $\theta1$ Radians and the second chain wheel 24 has rotated in a retard direction from the reference position C2Ref to the retarded position C2' by an angle of $\theta2$ Radians.

As will be described hereinafter, if the displacement of the first and chain wheels 23 and 24 is due to elongation of the primary drive chain 26 then there will be a fixed relationship between the magnitude of retardation of the first camshaft 13 as referred back to the first chain wheel 23 and the amount of second camshaft 14 retardation as referred back to the second chain wheel 24 and the retardation of the second camshaft 14 will be greater than retardation of the first camshaft 13.

With particular reference to FIG. 3 the length of the primary chain 26 between the driving chain wheel 25 and the first chain wheel 23 is defined as length 'L1' and the length of the primary chain 26 between the second driven chain wheel 24 and the first chain wheel 23 is defined as length 'L2'.

Therefore there is a fixed geometric ratio between the affect of a unit amount of primary chain elongation (E) and the angular rotation of the first and second chain wheels 23 and 24 due to that elongation.

That is to say:

For the first chain wheel 23 the effect of a unit amount of elongation (E) will be equal to E*L1.

Similarly, for the second chain wheel 24, the effect of a unit amount of elongation (E) will be equal to E*(L1+L2).

For example assuming that the elongation of the primary drive chain 26 is equal to 0.005 m per m then:

For the first chain wheel 23 the expected change in angular position will be due to a change in length $\Delta L$ equal to 0.005*L1 and for the second chain wheel 24 the corresponding change in angular position will be due to a change in length equal to 0.005*(L1+L2).

So for example if the length L1 is 0.320 m and the length L2 is 0.17 m then the corresponding values would be $\Delta L$ chain wheel 23=005*(0.32)=0.0016 m $\Delta L$ chain wheel 24=005*(0.32+0.17)=0.00245 m Therefore if the change in angular position is due to elongation of the primary drive chain 26 the angular position change $\theta2$ should be substantially equal to 1.53 times the angular position change $\theta1$.

If the change in angular position for the two chain wheels 23, 24 is not in the ratio of substantially 1.53 to 1.00 then it can be deduced that the variation in angular position is not due solely to elongation of the primary drive chain 26 and other factors such as sensing errors are involved. This can be used, for example, to provide an indication to a user of the motor vehicle 5 that the vehicle 5 needs to be checked out by a service representative or garage to investigate the cause of the error.

Similarly, if the measured change in angular position is not in the same retarded direction for the two chain wheels 23, 24, this indicates that the change in angular position is not due to elongation of the primary drive chain 26 but to some other factor such as for example the chain jumping a tooth on one of the first and second chain wheels 23 and 24. As before, this can be indicated to a user of the vehicle thereby enabling the integrity of the primary drive system to be checked out by a service representative or garage.

The pattern of change can also be evaluated to verify that it is a gradual change occurring over time and not a sudden change due to a system failure such as a broken slack adjuster resulting in tooth jumping.

To achieve this end, current values for change in angle $\theta1$, $\theta2$ can be compared with one or more previous values to see whether the change follows a consistent trend or whether there has been a rapid or step change since the last measurement was taken.

It will be appreciated that there is a fixed relationship between any change in length $\Delta L$ of the primary drive chain 26 and the corresponding angular change in angle $\theta1$, $\theta2$ based upon tooth pitch and diameter of the driven chain wheels 23, 24. Therefore a change in length of the primary drive chain 26 can be computed based upon the changes in angle $\theta1$, $\theta2$. It will be appreciated that because the respective camshaft phasers 21, 22 are locked in a predefined position when the measurements are taken the changes in angle of the chain wheels 23, 24 will be reflected by the same changes in angular position of the corresponding camshaft 13, 14.

It will also be appreciated that the measurements of angular change are always taken when the crankshaft is in the same rotational position due to the fact that the crankshaft sensor 19 provides a trigger output used to initiate measurement of the angular position of the two camshafts 13, 14. It will be also appreciated that the change in angular position will be the change in angle compared to the datum or reference angular positions C1Ref and C2Ref.

Operation of the engine system 10 is as follows:

When the engine is first run or is first run after the primary drive chain 26 has been replaced it is necessary to produce datum values for the non-elongated state. In order to do this the camshaft phasers 21, 22 are moved by the electronic controller 20 and any associated actuation apparatus to positions corresponding to datum or reference positions in which the magnitude of advance or retard of both camshafts 13, 14 is known. This could be fully retarded, fully advanced or a mid position in which the camshafts 13, 14 are neither advanced nor retarded.

The engine 15 is then run in idle mode and the crankshaft sensor 19 is used by the electronic controller as a trigger point for taking measurements of the angular positions of the two camshafts 13, 14. These values (C1Ref and C2Ref) are stored or saved in a non-volatile memory of the electronic controller 20 for future use.

During normal use of the motor vehicle 5 regular measurements of the values of change in angle $\theta 1$, $\theta 2$ of the chain wheels 23, 24 are taken. Irrespective of the time chosen to carry out these measurements, the engine 15 is run in idle mode and the camshaft phasers 21, 22 are moved by the electronic controller 20 to the same positions used to produce the datum or reference values for a non-elongated primary drive chain. These values are stored or saved in a memory of the electronic controller 20 for future use.

These measurements can be taken at any convenient time such as following a key-on event or at some other time when the engine is idling.

The electronic controller 20 is arranged to process the results of these measurements in what is referred to herein as an 'endless drive evaluation process' the purpose of which is to establish whether any variations in angular position of the two chain wheels 23, 24 can be attributed solely to primary drive chain elongation so that the magnitude of any changes in angular position of the two chain wheels 23, 24 can be reliably used to adaptively control other parameters of engine operation.

Table 1 provides one example of the data produced by these measurements for the first and second chain wheels 23 and 24.

TABLE 1

| First Chain Wheel 23 | | Second Chain Wheel 24 | |
| --- | --- | --- | --- |
| Datum Value | $\Phi 1$ | Datum Value | $\Phi 2$ |
| Last Measurement | $\theta 1'$ | Last Measurement | $\theta 2'$ |
| Current Measurement | $\theta 1$ | Current Measurement | $\theta 2$ |

The above measurements are used by the electronic controller 20 in the following manner:

Firstly, in 'Test 1' a "Same Direction Test" it is checked whether the change in angular positions for the two change wheels 23, 24 is in the same 'retarded' direction. For the purpose of this explanation retard will produce a positive result and advance will produce a negative result.

Therefore:

If ($\theta 1-\Phi 1$)=positive result and ($\theta 2-\Phi 2$)=positive result then elongation of the primary drive chain 26 is likely, or else some other effect is present. Note that the angles $\Phi 1$ and $\Phi 2$ correspond to the positions C1Ref and C2Ref respectively.

For example, if $\Phi 1=5$ degrees and $\theta 1=10$ degrees then (10−5) is a positive change of 5 degrees indicating a total retardation of 5 degrees from the reference position.

Similarly, if $\Phi 1=-5$ degrees (that is to say advanced by 5 degrees) and $\theta 1=10$ degrees then (10−(−5))=15 degrees a total retardation of 15 degrees from the datum value.

It will be appreciated that this test could also use the current and last measurements in which case it would be in the form:

If ($\theta 1-\theta 1'$)=positive result and ($\theta 2-\theta 2'$)=positive result then elongation is likely, or else some other effect is present.

Then in 'Test 2' a "Gradual Change Test" it is checked whether the change in angular position is a gradual change or a sudden change by comparing the previous measurement value with the current measurement value. This can be done for example by subtracting the current measured angle from the previous measured angle.

($\theta 1-\theta 1'$)=Result 1

($\theta 2-\theta 2'$)=Result 2

The magnitudes of the two results can then be compared with predefined limits of maximum expected elongation between measurements to confirm that the elongation is below the maximum expected elongation limit for each chain wheel 23, 24 and can also be compared with one another to see whether the two results correspond indicating a gradual change or whether one of the results differs significantly in magnitude to the other indicating a non-gradual change and can in some cases take the geometric ratio between the chain wheels 23, 24 into account as discussed hereinafter.

Then in 'Test 3' a "Geometric Ratio Test" the current measured values are compared to see whether they are in agreement with the known fixed geometric ratio for the primary drive system, which in the case of this example is 1.53.

Therefore if $\theta 2$ is substantially equal to 1.53 times $\theta 1$ then elongation of the primary drive chain 26 can be confirmed or validated as the primary cause of the changes in angular position of the driven chain wheels 23, 24.

It will be appreciated that in an ideal world the exact geometric ratio would be used for the comparison but in practice allowance must be made for measurement errors. Therefore in practice upper and lower limits are placed upon the comparison that is to say a small tolerance band is provided for the comparison.

For example the test can be constructed as:

Is $(1.5*\theta 1)<\theta 2<(1.55*\theta 1)$, if the result is YES then it is confirmed that primary drive chain elongation is the cause of the changes in angular position of the two driven chain wheels 23, 24 ELSE reject primary chain elongation as the primary cause of any change in driven chain wheel angular position.

In generalized terms the predefined ratio is a ratio of the length (L1) of the endless drive 26 from a drive wheel attached to the crankshaft which in this case is the chain wheel 25 to a driven wheel which in this case is the driven chain wheel 23 attached to one end of the first camshaft 13 with respect to the sum of the length (L1) of the endless drive 26 from the drive chain wheel 25 attached to the crankshaft to the driven chain wheel 23 attached to one end of the first camshaft 13 and the length (L2) of the endless drive 26 between the driven chain wheel 23 attached to the first camshaft 13 and a driven wheel which in this case is the driven chain wheel 24 attached to one end of the second camshaft 14.

It will be appreciated that a reciprocal of this ratio could also be used for the test.

If the results of Tests 1 to 3 all confirm that elongation of the primary drive chain 26 is the principle cause of the variations in angular position of the chain wheels 23, 24 from the expected positions, that is to say, the errors are genuine changes due to elongation and not due to sensor error or some other cause. If this is the case, the magnitudes of the changes of angular position can then reliably be used to adapt the operation of the engine system so as to operate the engine 15 more efficiently and with less risk of damage.

That is to say, the engine 15 is adaptively controlled based upon the results of the endless drive evaluation process described above.

For example, if the magnitude of the elongation of the primary chain 26 reaches a predefined level set at a level beyond which the slack adjuster 30 will not be able to accommodate any further elongation of the primary chain 26, then a user of the motor vehicle can be warned of this by, for example, lighting a malfunction indication lamp (MIL) or providing an alpha numeric feedback on a display of the motor vehicle 5.

In the case of a primary drive utilizing a chain rather than a toothed belt, it is known that elongation of the primary drive chain is due to oil quality problems such as fuel in the oil, soot in the oil and a high acidity level.

Therefore in this case, as soon as elongation of the primary drive chain is detected and confirmed a user of the motor vehicle can be advised to change the engine oil by, for example, lighting a poor oil quality malfunction indication lamp (Oil MIL) or providing an alpha numeric feedback on a display of the motor vehicle 5.

In the case of chain and toothed belt endless drives, if the magnitude of the elongation of the endless drive reaches a predefined level then a user of the motor vehicle 5 can be warned of this by, for example, lighting a malfunction indication lamp (MIL) or providing an alpha numeric feedback on a display of the motor vehicle 5. In the case of a toothed belt it is known that elongation beyond a predefined amount will risk sudden belt failure with catastrophic consequences to the moving parts of the engine 15. By warning the user when the predefined amount of elongation has been reached to take the vehicle 5 to a service provider such failures can be avoided.

The magnitude of the measured retardation can be used to ensure that contact between one of the exhaust valves and a corresponding piston does not occur by taking into account the retard already present in the system. It will be appreciated that if the valve closing of an exhaust valve is over retarded then the piston of the corresponding piston will make contact with the exhaust valve. If any errors in exhaust camshaft position are ignored as being signal errors there is a possibility of such contact occurring but by knowing that the sensed retardation is real (that is to say due to an actual elongation of the timing chain) the timing of exhaust valve closing can be set to ensure that no piston contact will occur.

The magnitude of the retardation can also be used to adaptively adjust a cylinder deactivation window as will be explained hereinafter with reference to FIGS. 5A and 5B.

Figure 5A:
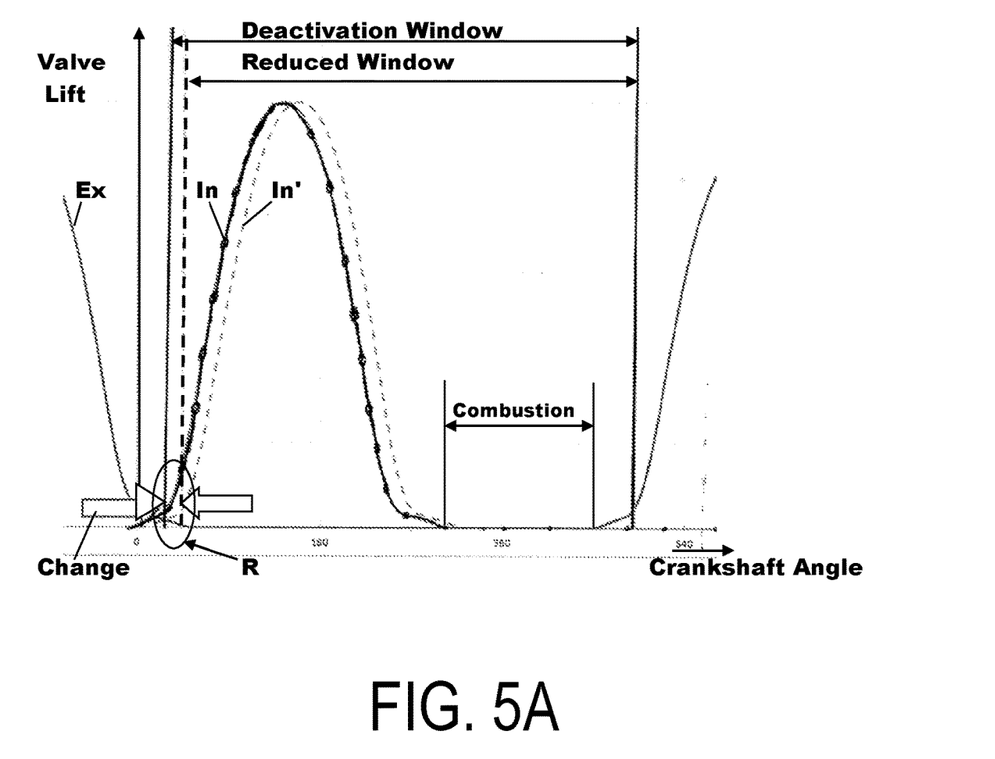
FIG. 5A is a chart showing the relationship between inlet camshaft rotational position and valve lift indicating the effect of endless drive elongation on a desired operating window for cylinder deactivation.

In FIG. 5A there is shown part of a valve timing chart referencing crankshaft angle against valve lift for the deactivatable cylinder of the engine 15. The position of an exhaust valve is shown by the solid line "Ex", the position of the inlet valve is shown by the solid dotted line "In" and the position of the same inlet valve when drive chain elongation has occurred is shown by the broken line "In'".

In the case of a new or non-elongated primary drive chain the window for deactivation of the cylinder is indicated by the distance between two vertical lines referenced as a double headed arrow 'Deactivation Window' and the reduced window for deactivation is indicated by the double headed arrow 'Reduced Window'.

Figure 5B:
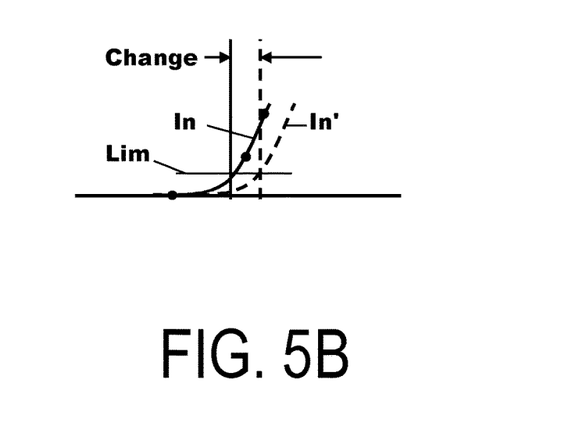
FIG. 5B is an enlargement of the region "R" on FIG. 5A.

The difference between the two windows is referenced as 'Change' in FIGS. 5A and 5B.

The end of the deactivation window is defined by a rotational position where the exhaust valve begins to open following a combustion stroke of the engine 15 and the start of the deactivation window is defined by a position where deactivation of the inlet valve is such that the valve will not remained closed if the inlet valve is deactivated at that point in time.

In FIG. 5B there is shown a horizontal line (Lim) indicating the point in the inlet valve cycle where deactivation of the inlet valve when the displacement of the inlet valve exceeds this level will ensure that the inlet valve will open for the current combustion cycle. If deactivation occurs below this level then the inlet valve will remain closed but fuel will be injected into the cylinder but there will be no combustion and so when deactivation is terminated excess fuel will remain in the cylinder which will flow out of the cylinder thereby increasing emissions and reducing the fuel efficiency of the engine 15.

This is because when the inlet valve has been open more than the limit Lim the force in the actuation mechanism will prevent the locking pins of the collapsing finger followers associated with the inlet valves from disengaging thereby ensuring that the inlet valve opens.

However, if the inlet valve is not open more than the limit Lim the force in the actuation mechanism will be so low that it will not prevent the locking pins of the collapsing finger followers associated with the inlet valves from disengaging and the inlet valve will be deactivated and will remain closed.

By using the magnitude of the retardation of the inlet camshaft to redefine the window for deactivation of the deactivatable cylinder it can be ensured that deactivation is prevented until the inlet valves will open for the current combustion cycle thereby preventing fuel from being trapped in the deactivated cylinder resulting in the disadvantages referred to above.

It will be appreciated that the electronic controller 20 is arranged to prevent deactivation of the deactivatable cylinder if the current inlet camshaft position is outside the set deactivation window.

Figure 4:
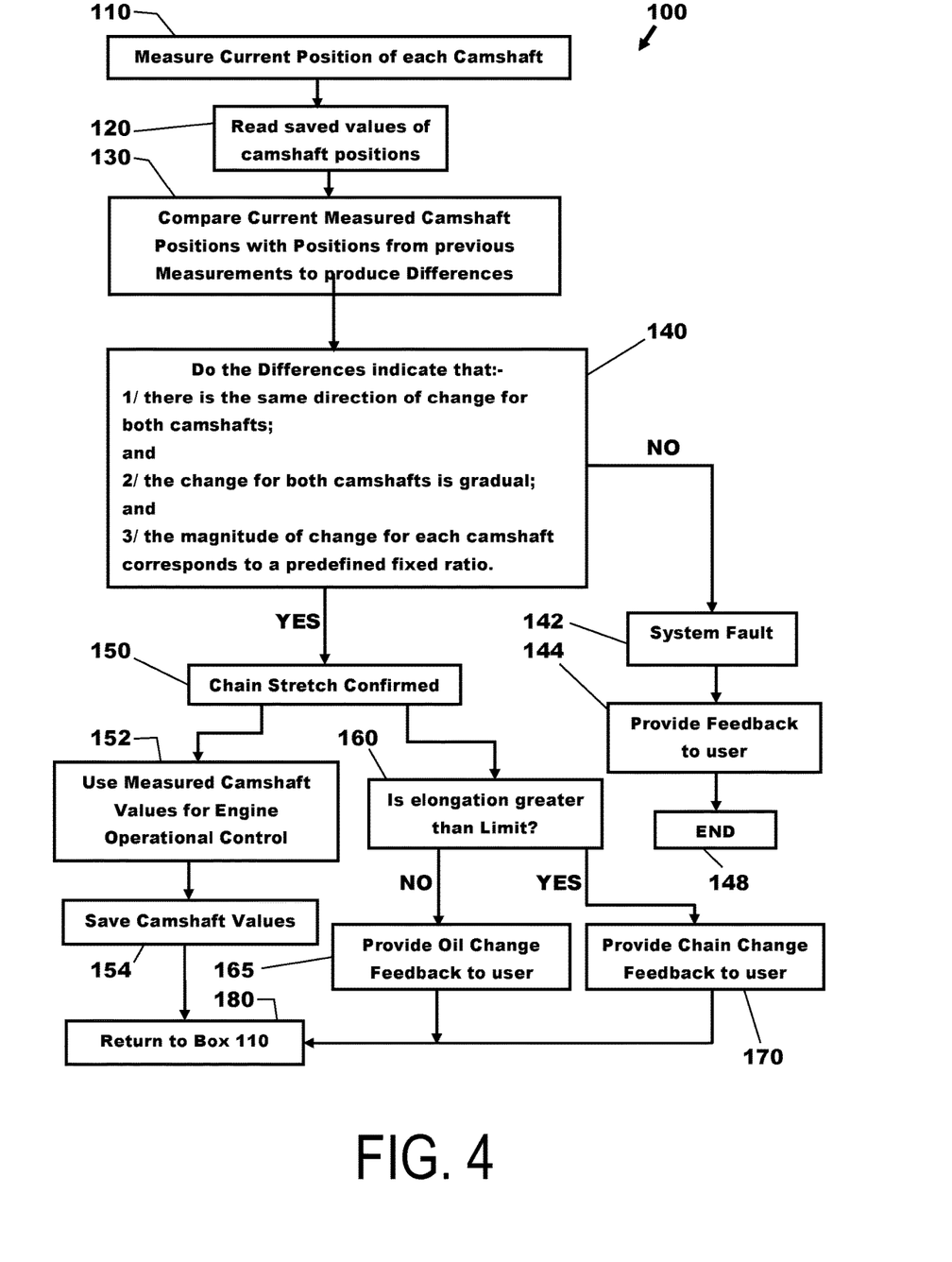
FIG. 4 is a high level flow chart of one embodiment of a method of adaptively controlling an engine system in accordance with a first aspect of the disclosure.

With particular reference to FIG. 4 there is shown a high level flow chart of a method 100 of adaptively controlling an engine system having a twin overhead camshaft engine in accordance with this disclosure.

The method starts in box 110 where the current angular position of each camshaft of the engine is measured using an associated position sensor such as the sensors 17, 18 shown in FIG. 1. The method then advances to box 120 where previously stored values of camshaft position are read from one or more memory devices. The values read will include at least a reference camshaft position for each of the two camshafts and the angular position of each camshaft when it was last measured.

The method then continues to box 130 where the current measured camshaft positions are compared with previous measurements to produce differences or change values between the earlier and current camshaft rotational positions.

The method then advances to box 140 where the differences are analyzed to establish whether three predefined tests can be passed. The three tests correspond to the "Same Direction Test", "Gradual Change Test" and "Geometric Ratio Test" previously described and will not be described again in detail.

If the "Same Direction Test" is passed indicating that both of the camshafts are moving angularly in the same retarded direction then a first flag is set to zero; otherwise it is set to one.

If the "Gradual Change Test" is passed indicating that the change in angular position of the two camshafts is a gradual change indicative of elongation of the endless drive then a second flag is set to zero; otherwise it is set to one.

If the "Geometric Ratio Test" is passed indicating that the ratio of the angular displacement of one of the camshafts compared to the angular displacement of the other camshaft is in agreement with a predefined fixed ratio then a third flag is set to zero; otherwise it is set to one.

Then the status of the three flags is evaluated using the logical expressions:

Is Flag 1+Flag 2+Flag 3=Zero?

If YES go to box 150, otherwise go to box 142.

That is to say, if all three tests have been passed, this indicates that the difference between expected and measured camshaft positions is due primarily to elongation of the endless drive and not to some other factor. Whereas, if one of the three tests is failed then the differences between expected and actual measured positions cannot be confirmed to be due to elongation of the endless drive.

In the case where one or more of the tests is failed the method proceeds to box 142 where it is presumed that a system fault is present. This could be from any source such as, for example, incorrect sensor operation, erroneous sensor calibration, a jumped tooth resulting in incorrect angular positioning of the camshaft or a malfunctioning phaser resulting in incorrect angular positioning of the camshaft. It will be appreciated that further checks could then be carried out to try and establish the exact cause of the error. From box 142 the method advances to box 144 where feedback is provided to a user of the motor vehicle by, for example, illuminating a malfunction lamp or by providing an alpha-numeric output on a display or by any other suitable means. The feedback could for example indicate that the vehicle needs to be taken to a service representative for checking or in some cases, where damage could be caused to the engine, indicate that the engine should be switched off as soon as possible.

From box 144 the method advances to box 148 where it ends.

Referring back to box 140 if all three of the tests are passed the method advances to box 150 where it is confirmed that any errors between expected and measured angular positions are actual rotational positions due to elongation of the endless drive and so the difference values can be used with surety to control the operation of the engine 15 of the engine system 10.

Boxes 110, 120, 130, 140 and 150 therefore comprise an 'endless drive evaluation process' used to confirm and quantify the presence of endless drive elongation.

From box 150 the information acquired is used in two ways.

In a first use the information is used to actively and adaptively control the operation of the engine 15 as identified in box 152 and in a second use to provide feedback to a user of the vehicle 5 based upon the results previously obtained as indicated by the boxes 160, 165 and 170.

In box 152 the magnitude of the retardation previously established is used to prevent valve to piston contact by adjusting valve timing to take into account the actual position of the camshaft including the effect of elongation of the endless drive and is further used to modify or adjust the position of a control window used to enable deactivation of one cylinder of the engine. It will be further appreciated that the measured angular positions of the two camshafts are used to provide a desired amount of advance and retard for the two camshafts in order to meet torque demands and emission targets for the engine.

After box 152 the method advances to box 154 where the most recent measurements of angular position are saved to form the last measurements ($\theta1'$, $\theta2'$) when the method is repeated.

Referring back to box 160 there is provided a test to see whether the total elongation of the endless drive is greater than one or more elongation limits.

In the case of the example shown two limits would be set, the first limit is set at a very low level of percentage elongation and the second limit is set at a high level of percentage elongation of the endless drive.

The first limit test is used to provide confirmation that elongation of the endless drive is occurring. In the case of a chain drive elongation of the chain will only occur when the quality of the oil is poor. This test can therefore be used to indicate to a user of the vehicle 5 that it would be advisable to change the oil as soon as possible in order to prevent or reduce the rate of further elongation of the chain. Therefore from box 160 the method will advance to box 165 when elongation of the endless drive is detected so as to inform the user of the motor vehicle to change the oil.

The second limit test is used to indicate when the service life of the endless drive has been reached or that the slack adjuster has reached the limit of its abilities to provide tension to the endless drive both of these require the endless drive to be replaced in order to prevent malfunctioning such a tooth jumping or endless drive failure.

Therefore from box 160 the method advances to box 170 when the elongation of the endless drive is greater than the second limit and in box 170 the user is informed that the endless drive needs to be replaced.

From boxes 154, 165 and 170 the method 100 will as indicated by box 180 return to box 110 to repeat the method so long as a key-on condition is still present. It will be appreciated that although not shown there will be further steps to ensure that the conditions for measuring the angular position of the camshafts 13, 14 are present and in some embodiments the method will only be repeated following a key-on event.

It will be appreciated that when a key-off event takes place the datum ($\Phi1$, $\Phi2$) and last measurements of camshaft angular position ($\theta1'$, $\theta2'$) are saved ready for the next time measurements are taken. It will be further appreciated that, although not shown in FIG. 4, the method 100 will also include a system reset routine used to set and save the datum values $\Phi1$, $\Phi2$) when the endless drive is first fitted or is replaced.

Therefore in summary, a method and engine system is disclosed in which elongation of an endless drive between a crankshaft and a pair of camshafts can be identified and quantified and then be used to base control of an engine system in order to prevent untimely failures and ensure safe and efficient running of an engine of the engine system as wear of the endless drive takes place.

Although the disclosure is described with reference to an engine using a chain as the endless drive between the crankshaft and the two camshafts it will be appreciated that the chain drive could be replaced by a toothed belt drive.

It will be further appreciated that the disclosure id not limited to use on a three cylinder inline engine but could be applied with advantage to engines have less or more cylinders and to engines having different configurations such as, for example and without limitation, Vee and Flat engines having two banks of cylinders where each bank of cylinders has a pair of camshafts.

It will be appreciated by those skilled in the art that although the disclosure has been described by way of example with reference to one or more embodiments it is not limited to the disclosed embodiments and that alternative embodiments could be constructed without departing from the scope of the disclosure as defined by the appended claims.

The invention claimed is:

1. A method of adaptively controlling a motor vehicle engine system comprising an engine having a crankshaft, first and second camshafts driven by an endless drive system including an endless drive from the crankshaft of the engine, and an electronic controller, the electronic controller including a processor and a memory for storage of instructions to be executed, wherein the method comprises:

measuring an angular position for one other of the first and second camshafts when the crankshaft is in a reference position and using the measured angular position to produce a value of change in angular position for one of the first and second camshafts;

measuring an angular position for the other of the first and second camshafts when the crankshaft is in the reference position and using the measured angular position to produce a value of change in angular position for the other of the first and second camshafts;

a first establishing step of establishing whether a change in angular position for one of the first and second camshafts is in a retarded direction and whether a corresponding change in angular position for the other of the first and second camshafts is in the retarded direction;

a second establishing step of establishing whether changes in angular position of the first and second camshafts are gradual changes;

a third establishing step of establishing whether a ratio of change of angular position of one of the first and second camshafts with respect to the other of the first and second camshafts is substantially equal to a predefined fixed ratio based upon a geometry of the endless drive system; and if results of the first, second, and third establishing steps indicate that a change in angular position for both the first and second camshafts is in the retarded direction and changes in angular position are gradual changes and the ratio of change in angular position of one of the first and second camshafts with respect to the other of the first and second camshafts is substantially equal to the predefined fixed ratio based upon the geometry of the endless drive system, the method further comprises confirming that a current change in angular position of the first and second camshafts is a result of elongation of the endless drive, and using the measured angular positions of the first and second camshafts to control one or more operational functions of the engine.

2. The method as claimed in claim 1, wherein the first establishing step comprises measuring the angular position of the first and second camshafts when the crankshaft is in the reference position, comparing the current measured angular positions of the first and second camshafts with previously saved datum angular positions for the first and second camshafts to quantify a difference in angular position of each camshaft compared to its respective datum position, and using the differences in angular position to establish whether the changes in angular position of the first and second camshafts are in the retarded direction for both camshafts.

3. The method as claimed in claim 1, wherein the second establishing step comprises comparing a current measured position of each the first and second camshafts when the crankshaft is in the reference position with one or more preceding measurements of angular position for a same of the first and second camshafts when the crankshaft is in the reference position, and, if the changes in angular position of the first and second camshafts follow a substantially uniform pattern, using this as confirmation that the changes in angular position of the first and second camshafts are a result of gradual elongation of the endless drive; or wherein the third establishing step comprises dividing the change in angular position of one of the first and second camshafts with a corresponding change in angular position of the other of the first and second camshafts to produce a calculated ratio of change and comparing the calculated ratio of change with a predefined ratio based upon the geometry of the endless drive system.

4. The method as claimed in claim 1, wherein the one or more operational functions of the engine is a timing of opening and closing of exhaust valves of the engine to meet a current demand.

5. The method as claimed in claim 1, wherein the one or more operational functions of the engine is a timing of opening and closing of inlet valves of the engine to meet a current demand.

6. The method as claimed in claim 1, wherein the one or more operational functions of the engine is a closing of an exhaust valve of a cylinder of the engine to avoid contact between a respective valve and a piston of a respective cylinder.

7. The method as claimed in claim 1, wherein the engine has a deactivatable cylinder and the one or more operational functions of the engine is a deactivation of the deactivatable cylinder of the engine, and wherein the first camshaft is an inlet camshaft and the measured angular position of the inlet camshaft of the engine is used to adapt a deactivation control window for the deactivatable cylinder of the engine.

8. The method as claimed in claim 1, wherein an operational function is a provision of an indication to a user of a motor vehicle when the measured angular positions of the first and second camshafts indicate that a predefined elongation limit for the endless drive has been exceeded, wherein the indication to the user is one of changing oil of the engine and changing the endless drive of the engine.

9. The method as claimed in claim 1, wherein the first camshaft is an inlet camshaft and the second camshaft is an exhaust camshaft.

10. The method as claimed in claim 1, wherein the endless drive system comprises a chain engaged with a driving chain wheel attached to the crankshaft of the engine and first and second driven chain wheels fastened to the first and second camshafts respectively.

11. A motor vehicle engine system comprising an engine having first and second camshafts driven by an endless drive system including an endless drive from a crankshaft of the engine, a crankshaft sensor to sense a rotational position of the crankshaft, and first and second camshaft sensors to sense rotational positions of the first and second camshafts respectively when the crankshaft is in a reference position; and an electronic controller to process an output from the crankshaft sensor and outputs from the first and second camshaft sensors, the electronic controller including a processor and a memory for storage of instructions to be executed, wherein the electronic controller is operable to:

a first use step of using the outputs from the first and second camshaft sensors to establish whether a change in angular position for one camshaft of the first and second camshafts is in a retarded direction and whether a corresponding change in angular position for the other of the first and second camshafts is in the retarded direction;

a second use step of using the outputs from the first and second camshaft sensors to establish whether changes in angular position of the first and second camshafts are gradual changes;

a third use step of using the outputs from the first and second camshaft sensors to establish whether a ratio of change of angular position of one of the first and second camshafts with respect to the other of the first and second camshafts is substantially equal to a predefined fixed ratio based upon a geometry of the endless drive system; and if results of the first, second, and third use steps indicate that a change in angular position is in the retarded direction for both the first and second camshafts and the changes in angular position of the first and second camshafts are gradual changes and the ratio of change in angular position of one of the first and second camshafts with respect to the other of the first and second camshafts is substantially equal to the predefined fixed ratio based upon the geometry of the endless drive system, the electronic controller is operable to confirm that a current change in angular position of the first and second camshafts is a result of elongation of the endless drive, and is further operable to use measured angular positions of the first and second camshafts to control one or more operational functions of the engine.

12. The engine system as claimed in claim 11, wherein the electronic controller is operable to establish whether a change in angular position for one of the first and second camshafts is in the retarded direction as a corresponding change in angular position for the other of the first and second camshafts by using the first and second camshaft sensors to measure the angular position of the first and second camshafts when the crankshaft is sensed by the crankshaft sensor to be in the reference position, compare current measured angular positions of the first and second camshafts with datum angular positions for the first and second camshafts previously saved in the memory of the electronic controller to quantify a difference in angular position of each of the first and second camshafts compared to its respective datum position and use the differences in angular position to establish whether the changes in angular position of the first and second camshafts are in the retarded direction for both the first and second camshafts.

13. The engine system as claimed in claim 11, wherein the electronic controller is operable to establish whether changes in angular position of the first and second camshafts are gradual changes by comparing a current measured position of one of the first and second camshafts as provided by the outputs from the first and second camshaft sensors when the crankshaft is sensed by the crankshaft sensor to be in the reference position with one or more preceding measurements of angular position for the one of the first and second camshafts when the crankshaft is in the reference position and, if the changes in angular position of the first and second camshafts follow a substantially uniform pattern, confirm that the changes in angular position of the first and second camshafts are a result of gradual elongation of the endless drive; or wherein the electronic controller is operable to establish whether a ratio of change of angular position of one of the first and second camshafts compared to the other of the first and second camshafts is substantially equal to the predefined fixed ratio based upon the geometry of the endless drive system by dividing a change in angular position of one of the first and second camshafts with a corresponding change in angular position of the other of the first and second camshafts to produce a calculated ratio of change and comparing the calculated ratio of change with a predefined ratio stored in the memory of the electronic controller based upon the geometry of the endless drive system.

14. The engine system as claimed in claim 13, wherein the predefined ratio is a ratio of a length of the endless drive from a drive wheel attached to the crankshaft to a driven wheel attached to one end of the first camshaft with respect to a sum of the length of the endless drive from the drive wheel attached to the crankshaft to the driven wheel attached to one end of the first camshaft and the length of the endless drive between the driven wheel attached to the first camshaft and a driven wheel attached to one end of the second camshaft.

15. The engine system as claimed in claim 11, wherein the one or more operational functions of the engine is a timing of opening and closing of exhaust valves of the engine to meet a current demand.

16. The engine system as claimed in claim 11, wherein the one or more operational functions of the engine is a timing of opening and closing of inlet valves of the engine to meet a current demand.

17. The engine system as claimed in claim 11, wherein the one or more operational functions of the engine is a closing of an exhaust valve of a cylinder of the engine to avoid contact between a respective valve and a piston of a respective cylinder.

18. The engine system as claimed in claim 11, wherein the engine has a deactivatable cylinder and the one or more operational functions of the engine is a deactivation by the electronic controller of the deactivatable cylinder of the engine; wherein the first camshaft is an inlet camshaft and the measured angular position of the inlet camshaft of the engine is used to adapt a deactivation control window associated with the deactivatable cylinder of the engine and the electronic controller is arranged to prevent deactivation of the deactivatable cylinder if a current inlet camshaft position is outside the deactivation control window.

19. The engine system as claimed in claim 11, wherein an operational function is a provision by the electronic controller of an indication to a user of a motor vehicle when measured angular positions of the first and second camshafts indicate that a predefined elongation limit for the endless drive has been exceeded, wherein the indication to the user is one of changing oil of the engine and changing the endless drive of the engine.

20. The engine system as claimed in claim 11, wherein the first camshaft is an inlet camshaft of the engine and the second camshaft is an exhaust camshaft of the engine.

* * * * *